INVENTORS
H. C. A. VAN DUUREN
C. J. VAN DALEN AND
H. DA SILVA
BY Hugh A. Kirk
ATTORNEY INVENTORS
H. C. A. VAN DUUREN
C. J. VAN DALEN AND
H. DA SILVA
BY Hugh A. Kirk
ATTORNEY INVENTORS
H. C. A. VAN DUUREN
C. J. VAN DALEN AND
H. DA SILVA
BY Hugh A Kirk
ATTORNEY Sept. 16, 1969 H. C. A. VAN DUUREN ET AL 3,467,776
SYSTEM FOR AUTOMATIC ERROR DETECTION AND
CORRECTION OF TELECOMMUNICATED SIGNALS
Filed Nov. 25, 1966 4 Sheets-Sheet 4

| CHANNEL A<br>CHANNEL B | OO<br>OV | OP<br>OW | OS<br>OZ |
|---|---|---|---|
| NORMAL POS. | SPACE | SPACE | SPACE |
| 1st REVOLUTION | MARK | SPACE | MARK |
| 2nd " | MARK | MARK | MARK |
| 3rd " | SPACE | MARK | MARK |
| 4th " | SPACE | SPACE | MARK |

RECEIVER REPETITION CYCLE TRIGGERS OPERATIONS

FIG. 6

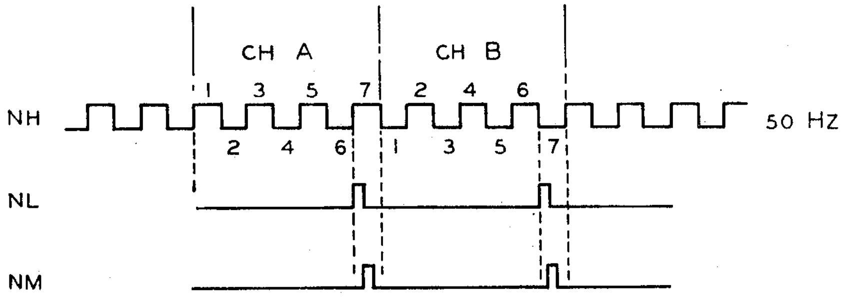

FIG. 7

| SIGNAL ELEMENTS: | (1) | (2) | (3) | (4) | (5) | (6) | (7) |
|---|---|---|---|---|---|---|---|
| STEPS OF ONE DISTRIBUTOR REVOLUTION | AA | AB | AC | AD | AE | AF | AG |
| TRIGGER BJJ INPUT TERMINAL 14 BECOMES NEGATIVE | – | | | – | | – | |
| TRIGGER BJJ INPUT TERMINAL 13 BECOMES NEGATIVE | | – | | | – | | |
| TRIGGER BJJ OUTPUT TERMINAL 12 FOR SIGNAL "I" | – | + | + | – | + | – | – |
| TRIGGER BJJ OUTPUT TERMINAL 12 SIGNAL "I" | SPACE | MARK | MARK | SPACE | MARK | SPACE | SPACE |

TRANSMITTER OUTPUT TRIGGER OPERATION

FIG. 8

INVENTORS
H. C. A. VAN DUUREN
C. J. VAN DALEN AND
H. DA SILVA
BY Hugh A. Kirk
ATTORNEY

United States Patent Office 3,467,776

Patented Sept. 16, 1969

3,467,776

SYSTEM FOR AUTOMATIC ERROR DETECTION AND CORRECTION OF TELECOMMUNICATED SIGNALS

Hendrik Cornelis Anthony van Duuren, Wassenaar, and Christiaan Johannes van Dalen and Herman da Silva, Voorburg, Netherlands, assignors to De Staat der Nederlanden, ten Deze Vertegenwoordigd Door de Directeur-Generaal der Posterijen, Telegrafie en Telefonie, The Hague, Netherlands

Continuation-in-part of application Ser. No. 86,404, Feb. 1, 1961. This application Nov. 25, 1966, Ser. No. 596,862

Claims priority, application Netherlands, Feb. 15, 1960, 248,434

**Int. Cl. H04l *1/16***

U.S. Cl. 178—23 13 Claims

ABSTRACT OF THE DISCLOSURE

A telegraph type signal communication system between two stations for the automatic detection and correction of telegraph type signals in which no signal can be lost, transposed, or repeated, by transmitting a special service signal to set up uninterruptible repetition cycles for the same number of signals at each station when an error is detected, which repetition cycles at both stations must be in signal interval or revolution synchronism before repetition of the stored group of the last transmitted signals including the one or ones to be corrected can be repeated, both of which repetition cycles must be completed before being terminated.

Parent U.S. patent application Ser. No. 86,404, filed Feb. 1, 1961, of which this application is a continuation-in-part, now abandoned.

BACKGROUND OF INVENTION

Automatic error detection and correction equipment have proved their utility, such as for example by the system disclosed in Van Duuren U.S. Patent No. 2,703,361, issued Mar. 1, 1955. In this system the transmitted elements in each multielement signal are made mutually protective by having them comprise impulses having one of two different electrical values (such as positive and negative), which values are so chosen as to produce a constant total electrical value for each transmitted signal. Any deviation from this constant relationship in the signals received at the receiving station is an indication that the signal has been mutilated in transit from one station to the other, calling for a retransmission of that signal. Thus the detection of a mutilation started a repetition cycle and transmitted a special service signal to request a repetition. Then whenever such a special service signal was detected, a special service signal was transmitted back followed by traffic signals from storage, and if such a special service signal was received during a repetition cycle, it was always ignored. Suppose, however, that in the same multielement signal, one positive element was mutilated to be detected as a negative element and one negative element was mutilated to be detected as a positive element, i.e., a so-called transposition. Then the constant ratio which exists between positive and negative signal elements is retained, but the complete signal is a faulty signal, and this fault cannot be detected by this prior art system nor by the similar system disclosed in the Van Dalen U.S. Patent No. 2,988,596.

Such transpositions also are very harmful during a repetition cycle, as often the correct reception of a signal in a predetermined phase of this cycle is relied upon for the repetition cycle, so that a simulation of such a correct signal may involve a great number of signals being faulty.

Thus for the most accurate working, different types of systems must meet requirements of different stringency. These systems range from the type working with a complete permanent synchronism after an initial synchronization, via that of quasi-synchronous systems, to that of systems comparable to the arhythmic systems used in wire telex connections.

Disturbances of synchronism may occur notably during a protracted failure of good reception, which entails the risk that after the resumption of dependable communication, a number of signals get lost or are printed twice. Such disturbing phase shifts are more liable to occur when the stations are controlled by less stable generators. Applicants' copending U.S. Patent application Ser. No. 1,313 filed Jan. 8, 1960, now U.S. Patent No. 3,156,767, issued Nov. 10, 1964, deals with a system to insure synchronism in such cases by use of a "system cycle" in which the sequence of revolutions is repeated according to a pattern of inverted polarities, and the special service signals are adapted in polarity to the polarity pattern of the signals for which they are substituted. The synchronization of the system cycles of this system is effected by bringing the stations in the correct phase-position at the start of the transmission, and so starting again after a prolonged disturbance in the connection. In this system, at the detection of a mutilation, a repetition cycle is started and a special service signal is repeatedly transmitted until a special service signal is received back, and then the remaining traffic signals are retransmitted from storage. There is no means provided in this prior system to terminate a period of repetition when a special service signal is detected only at a predetermined signal interval or revolution of the repetition cycle; nor is a special service signal always repeated after a first special service signal is received, even during a repetition cycle, before the message signals are repeated from storage.

SUMMARY OF THE INVENTION

This invention relates to a system for the automatic detection and correction of multielement telecommunication signals during an uninterruptible repetition cycle, when such signals are transmitted back and forth between two stations. More particularly, it deals with telegraph signals in which the reception of a faulty signal at one or a receiving station starts this repetition cycle at that receiving station. This reception of a faulty signal also starts at that receiving station, a repeatedly transmitted special service signal, such as "I," on the return path to request a repetition.

When the first unmutilated special service signal "I" is detected at the other or transmitting station, it first causes such a special service signal "I" to be transmitted back to the one or receiving station. If such a repetition cycle is not already in progress at the transmitting station, this first special service signal "I" also starts a repetition cycle of the same duration at said transmitting station. After the special service signal "I" has been transmitted back to the one or receiving station, a group of the last transmitted message signals are retransmitted from a storage device in said transmitting station, which group includes the faulty signal to be repeated.

If and only if a returned special service signal "I" is received during a given signal interval or revolution time of the repetition cycle, can the period of repetition at that station be terminated. Otherwise the repetition cycle is repeated until it is so synchronized. The duration of this uninterruptible repetition cycle corresponds to a predetermined number of multielement signals, and is sufficiently long to compensate for twice the longest transmission time between any two stations, so that a special service signal "I" can be received back during the preselected revolution time.

Thus a repetition cycle is initiated at each station either by a faulty signal or by such a special service signal "I." The first special service signal to be received at any station causes one of said special service signals to be transmitted from that station before traffic signals are retransmitted from storage whether a repetition cycle is in progress or not. Since the repetition cycle at each station is not affected by errors or the reception of special service signals "I," except during the particular given signal interval or revolution depending upon the propagation time between the stations, there is no risk of a repetition cycle being improperly terminated by a transposition of elements in any signal.

DESCRIPTION

Objects and advantages

Therefore, it is an object of this invention to provide an improved automatic error correcting telecommunication system to prevent unobserved faulty receptions, such as transpositions, and to insure completion of each repetition cycle correctly.

Another object is to provide in such a system the security that the receiving conditions in the station requested to make the repetition are good by the reception of a special service signal at a definite signal interval or revolution during the repetition cycle to insure proper synchronism and thereby prevent loss of signals or duplication of signals, without the need of also employing a system cycle.

Brief description of views

The above mentioned and other features and objects of the invention and the manner of attaining them will become apparent and the invention itself will be understood best by reference to the following description of an embodiment of the invention taken in conjunction with the accompanying drawings, wherein:

FIG. 6 is a chart of positions of the repetition cycle triggers in the receiver circuit of FIG. 4 for channels A and B during one repetition cycle of four revolutions;

FIG. 7 is a wave diagram of the impulses from the controlling impulse triggers in the receiver circuit of FIG. 4; and FIG. 8 is a chart of the polarities of the terminals of output trigger of the special signal "I" generator circuit in the transmitter circuit of FIG. 5 during the steps of the distributor to produce this seven element special service signal "I."

Figure 1:
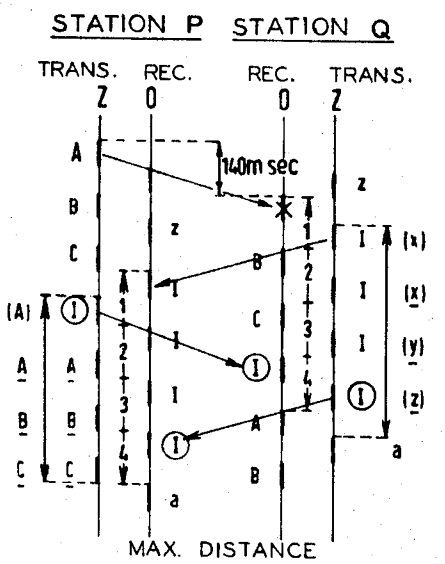
FIG. 1 is a schematic time diagram of a two-way synchronous two channel or diplex communication system in which the first signal "A" of the first channel is received mutilated at a remote station and special service signals "I" are returned automatically until the correct signal "A" is received.
Figure 2:
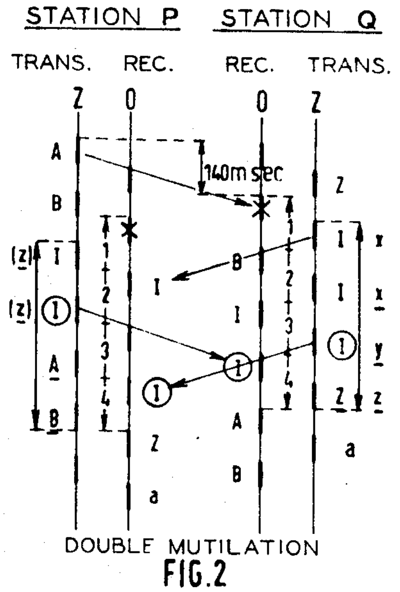
FIG. 2 is a schematic time diagram similar to FIG. 1 in which the signal "Z" in the first channel from the remote station is also received mutilated.
Figure 3:
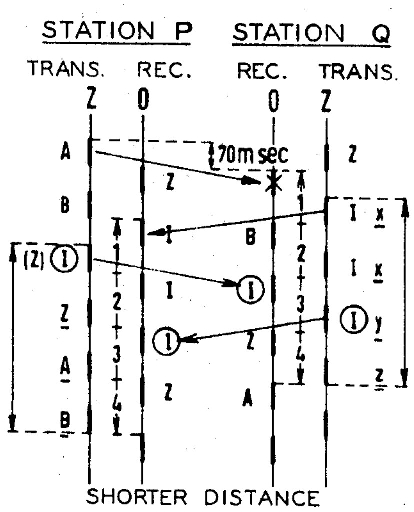
FIG. 3 is a time diagram similar to that shown in FIG. 1, but wherein the propagation time is shorter between the two stations.

Detailed description (1) *General operation.*—In FIGS. 1, 2, and 3, the vertical lines Z refer to the transmitters and the vertical lines O refer to the receivers at each station P and Q, and the heavy dashes on these vertical lines refer to the time taken for the signals for one of two channels of alternately interspersed signals, or a diplex duplex system. The time runs vertically downwardly in each one of the FIGS. 1, 2 and 3. The numbers of each signal interval, revolution, or rotation, i.e., for two signals, one from each channel, in the repetition cycle are numbered 1, 2, 3 and 4, with the letters of the alphabet being shown as the intelligence signals that are transmitted adjacent the heavy vertical dashes for the first of the two channels.

FIGS. 1 and 2 are time diagrams of two-way synchronous connections with the propagation time being greater than 70 ms. (milliseconds), namely 140 ms.

In FIG. 1 is shown the transmission between a station P and a station Q in both directions (so-called duplex transmission). The signal "A" is transmitted from station P to station Q and received mutilated in station Q (shown by a cross (X)).

After the detection of the mutilation in station Q, a "repetition cycle" is started and the printer is blocked. During this repetition cycle the station Q transmits a service signal "I" to request for a repetition, followed by a number of like service signals "I." This signal "I" is received in station P, and a repetition cycle is started in station P. During this repetition cycle, the station P transmits a service signal "I" (encircled) to inform the other station Q that a repetition follows, and after that it retransmits the signals "A," "B," and "C" out of a memory which always contains the last three signals transmitted. The service signal "I" (encircled) is received in station Q during the fourth signal interval or revolution of the repetition cycle of the receiver distributor. This signal "I" (encircled) is received correctly and is received during the predetermined revolution of the repetition cycle, in this example, the fourth revolution. Then station Q transmits a signal "I" (encircled) again after which the printer in station Q is unblocked, and the signal "A" is now received unmutilated and printed.

The signal "I" (encircled) transmitted during the fourth revolution of the repetition cycle in station Q is received correctly in station P. This signal "I" (encircled) being received during the definite revolution of the repetition cycle and being received correctly, results in terminating the repetition in station P, and in changing it over now to normal transmission.

In FIG. 2 the signal "A" is transmitted from station P to station Q and received mutilated in station Q (shown by a cross (X)). After the detection of the mutilation in station Q, a repetition cycle is started and the printer is blocked.

The signal "Z" transmitted from station Q to station P also is received mutilated in station P (shown by a cross (X)). After the detection of this mutilation in station P, a repetition cycle is also started and its printer is blocked.

During the repetition cycle in station Q, the station Q transmits a service signal "I" to request for a repetition, followed by a number of like service signals "I," until station Q receives back a service signal "I," in this example, in the third revolution. Then station Q, having detected this special signal "I" correctly, transmits one more service signal "I" (encircled). This latter special service signal "I" (encircled) is detected in station P during a definite revolution, the fourth revolution, and the repetition at station P is considered to be terminated.

Similarly, during the repetition cycle in station P, the station P transmits a service signal "I" to request for a repetition, followed by a number of like service signals "I," until station P receives back a service signal "I," in this example, during the second revolution of the repetition cycle. Then station P transmits one more signal "I" (encircled), and this service signal "I" (encircled) is detected in station Q during a definite revolution, the fourth revolution, and the repetition at station Q is considered to be terminated.

FIG. 3 is a diagram of a short connection (i.e., 70 ms.), in which again signal "A" is disturbed when being transmitted from station P to station Q. The special service signal "I" (encircled) arrives back at station Q in the third rotation in the repetition cycle, then the signal "Z" is repeated from station P, and after that the signal "A" that had been mutilated. The printer of the relevant receiver at station Q is still blocked for the duration of the four rotations, but the receiver at station Q still remains responsive to the arrival of the "I" (encircled) at the third rotation, without allowing however, the printing of the "Z" at the fourth rotation. After the reception of a signal "I" (encircled) in a repetition cycle at station Q, the first signal to be transmitted must be a signal "I" (encircled), after which, if the repetition cycle has not yet finished, the transmitter goes on with transmitting signals, namely "Z," from the memory circuit.

After the reception of a faulty signal, signals "I" are transmitted and so on up to and including the next rotation after the reception of a signal "I."

Thus in a repetition cycle of four rotations for two sequential channels, a telegraphic speed of 100 bauds and a propagation time per path of more than 70 milliseconds always ends during the fourth rotation in a special service signal "I." However, with a propagation time of less than 70 milliseconds, a signal "I" is always found on the third rotation of the repetition cycle. Accordingly traffic can be continued, if a signal "I" is found at the third or the fourth rotation of the repetition cycle.

Figure 4:
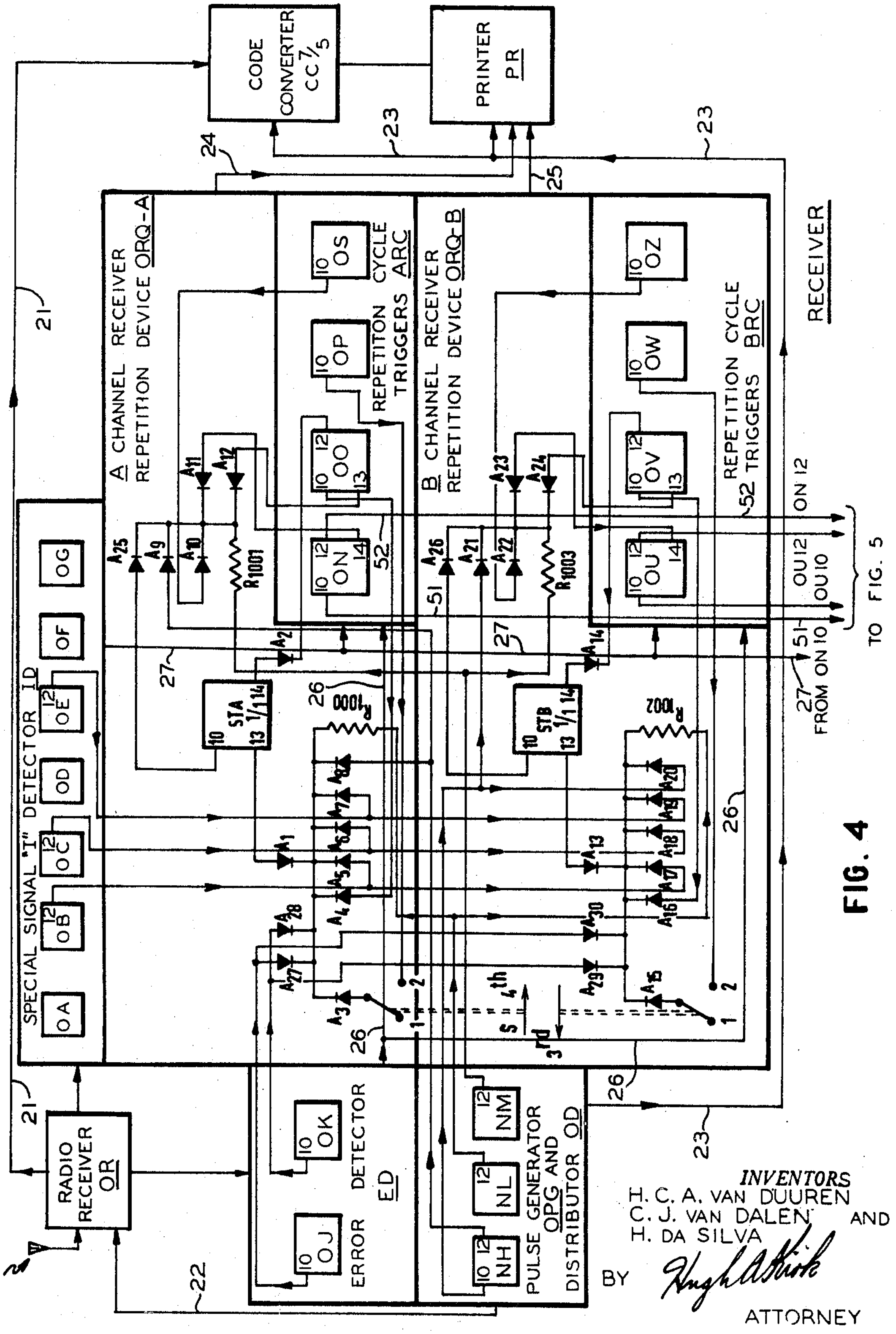
FIG. 4 is a schematic block wiring diagram of a receiver circuit at any one station in a two channel system including the repetition equipment for the function of this invention as described in FIGS. 1, 2 and 3.
Figure 5:
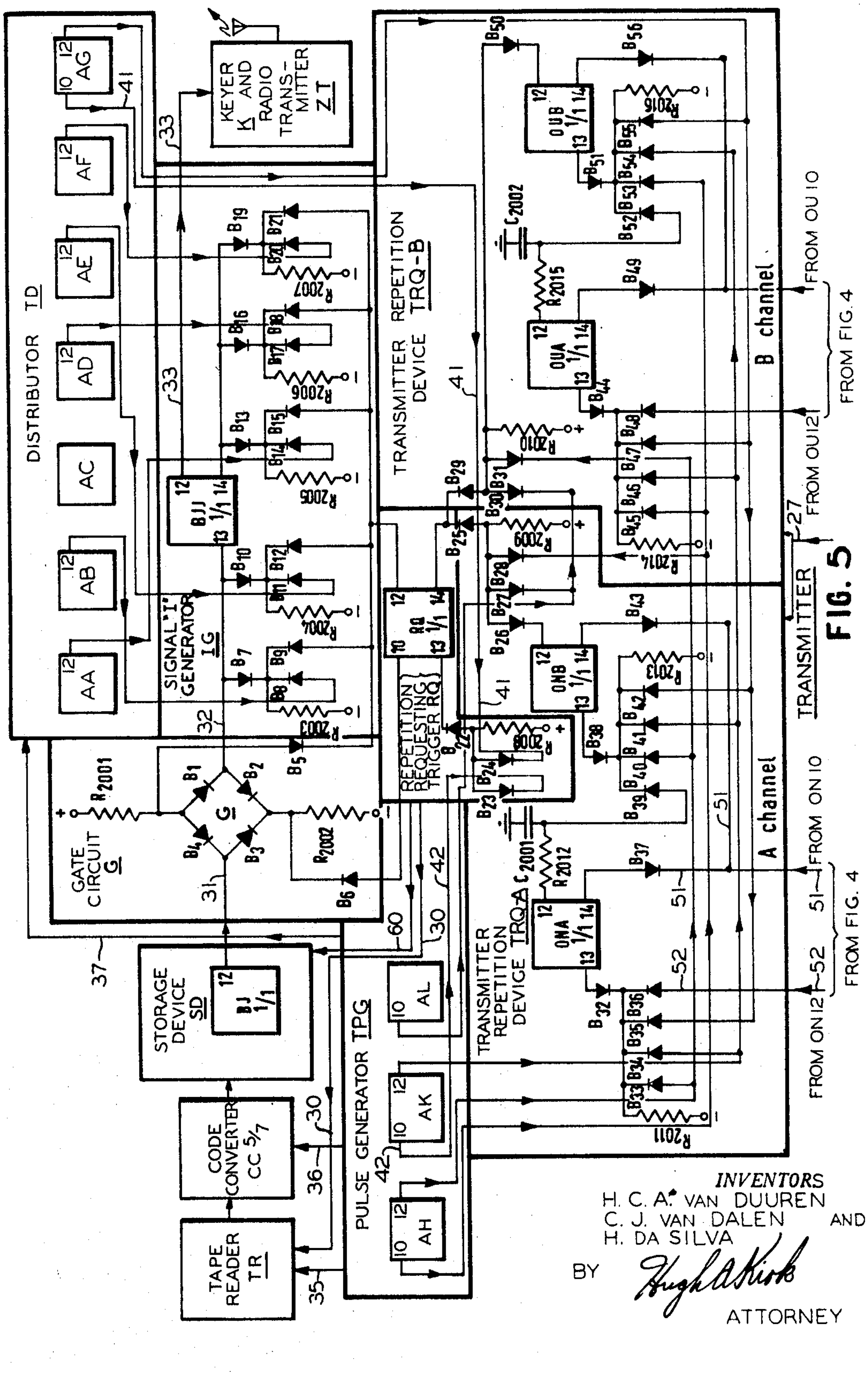
FIG. 5 is a schematic block wiring diagram of that part of a transmitter circuit at any one station in a two channel system which comprises the repetition equipment according to this invention which cooperates with that equipment shown in FIG. 4.

(2) *Receiver.*—In the schematic block wiring diagrams of FIGS. 4 and 5 all of the square boxes represent triggers and are the same, having four terminals 10, 12, 13 and 14, which terminals are located in the same parts of each square and are responsive similarly to similar potentials.

Since the error detection and correction circuit of this invention does not start to operate until an error is detected at the receiver, the details of the receiver circuit of this invention will be described first in connection with FIG. 4.

During normal operation, that is, without errors, the multielement code signals are received at the radio receiver OR, checked for correctness in the error detection circuit ED, passed via conductor 21 to the code converter CC7/5, and thence to the output printer PR. All of these circuits are sequentially controlled by a pulse generator circuit OPG which includes triggers NH, NL and NM and a distributor OD, and are connected thereto via conductors 22 and 23.

When an error is detected in a multielement signal in one channel by the error detector circuit ED, or when a special service signal "I" is detected in one channel in the special service signal "I" detector circuit ID, the corresponding one of the two similar receiver repetition devices ORQ–A and ORQ–B for the two channels A and B, respectively, is operated under the control of the triggers in the pulse generator circuit OPG. The energization of a receiver repetition device ORQ–A or ORQ–B starts the repetition cycle at that station and also blocks the printer PR via conductors 24 or 25, respectively.

In each repetition device ORQ–A and ORQ–B there is a repetition cycle circuit ARC and BRC, respectively, which repetition cycle circuits are controlled by the error detection device ED via conductor 26 and by the special service signal detector ID via conductor 27. Triggers ON, OO, OP and OS in the repetition cycle circuit ARQ are active during a repetition cycle in channel A. Trigger ON goes to "mark" at the reception of a signal "I" in "I" detector ID via conductor 26, and to "space" at the detection of a mutilation in error detector ED via conductor 27. Trigger OO is in "space" during the third and fourth revolution, and trigger OP is in "space" during the first and fourth revolution of a repetition cycle (see chart FIG. 6). Thus the triggers OO and OP uninterruptedly count four revolutions for one repetition cycle once they are instigated.

Specifically when channel A detects an error, the error detector ED starts a repetition cycle by changing the first repetition cycle counter trigger OO in circuit ARC in FIG. 4 to its "mark" condition (see FIG. 6). This action makes its terminal OO–12 turn negative, which, via diode $A_2$, brings the trigger STA in the repetition device ORQ–A in FIG. 4 from its "mark" to its "space" potential position.

This thus changed trigger STA can be brought to its normal or "mark" potential position again to stop the repetition cycle under the condition that an unmutilated special service signal "I" is received, indicating that the transmitting station has received a request for repetition of the mutilated signal. That is when: triggers OB, OC, OE in the special service signal "I" detector circuit ID are detected to be in their "mark" positions, the trigger OO is in its "space" position again, and the error detection ED triggers OJ–OK are detected to be in "space" position during either the third or fourth revolution of the repetition cycle depending upon the position of 1′ or 2′, respectively, of the switch S (at the left of the circuits ORQ–A or ORQ–B in FIG. 4). This switch S is preset by being pivoted at its contacts adjacent diodes $A_3$ and $A_{15}$, into its position 1′ when the propagation time of the circuit between stations P and Q is less than 70 milliseconds, and into its position 2′ when the propagation time between stations P and Q is greater than 70 milliseconds. In this latter position 2′ the second repetition cycle trigger OP must then be in its "space" position, because it is connected by its terminal OP–10 to the control circuit of the trigger STA via switch S position 2′. In other words, with a propagation time of less than 70 milliseconds, a special service signal "I" is always found in the third revolution of the repetition cycle (see FIG. 3), so that the switch S then has to be switched into its position 1′. With a propagation time more than 70 milliseconds, a signal "I" is always found on the fourth revolution of the repetition cycle (see FIG. 1), so that the switch then has to be switched into its position 2′.

The seven elements of the special service signal "I" are −, +, −, +, −, −, and are directed, respectively, to the seven triggers OA through OF of the special service signal detector ID in FIG. 4. The reception of an unmutilated signal "I" brings trigger OA to "space" position, trigger OB to "mark" position so its terminal OB–12 becomes negative, trigger OC to "mark" position so its terminal OC–12 becomes negative, trigger OD to "space" position, trigger OE to "mark" so its terminal OE–12 becomes negative, trigger OF to "space" position, and trigger OG to "space" position.

Thus, the detection circuit ID for this service signal "I" feeds via the respective terminals 12 of the code receiving trigger OB, OC and OD in "mark" position, a negative voltage to diodes $A_5$, $A_6$, and $A_7$ of the logic circuit in the receiver repetition device ORQ–A. During this time a negative voltage from the controlling impulse trigger NL of pulse generator OGP, occurs in the seventh time interval or signal element of the local distributor OD, which is effective to discriminate channel A signals from channel B signals, when the controlling impulse trigger NH is in its "mark" position (see FIG. 7). Accordingly during that seventh time interval or period, the terminal NH–12 is negative, and this potential is brought to the diode $A_8$. Also this negative potential is brought to the diode $A_9$ of the logic circuit which controls the repetition cycle triggers ARC. In addition the error detecting ED or "mark"/"space" counting triggers OJ and OK terminals 10 feed a negative potential to the diodes $A_{28}$ and $A_{27}$ when a correct or an unmutilated special service signal "I" is received. So with the switch S in position 1′, the negative voltage at the terminal OO–10 makes the diode $A_4$ also negative, so that the logic at the input terminal STA–13 returns the trigger STA to its "mark" position. An additional negative voltage at the diode $A_3$ is required for discriminating the signal "I" on the fourth revolution of the repetition cycle, which is realized when the switch S is in position 2′, and repetition cycle trigger OP is in "space."

Thus when the trigger STA is brought to its "mark" position as a result of the service signal "I" being detected on the third or fourth revolution of the repetition cycle, the printer PR is deblocked via conductors 24 and 25 and the terminal STA–10 feeds a positive potential to diode $A_{25}$ which blocks the logic device of diodes $A_{25}$, $A_9$, $A_{10}$, $A_{11}$, $A_{12}$ and resistor R–1001, so that neither repetition cycle trigger ON nor the repetition cycle OO can now be controlled via this logic circuit, which insures the ending of the repetition cycle when it reaches its fourth revolution.

However, if no signal "I" were detected, either on the third or on the fourth revolution of the repetition cycle, the repetition cycle continues to rotate because the trigger STA stays in its "space" position. This position makes its terminal STA–10 feed a negative potential to the diode $A_{25}$ so that the logic device just mentioned above can become effective at the control impulse trigger NM impulse time, which impulse, due to the negative voltage at the terminal NH–12, can be effective in the channel A seventh time element period only. This is because the impulse controlling trigger NH is in the "mark" position during the seventh element time interval of a signal in channel A, and in the "space" position during the seventh element time interval of the channel B (see wave diagram of FIG. 7). In order not to effect the repetition cycle triggers ON and OO during the repetition cycle, the "space" condition potential of the last trigger OS in the repetition cycle is added to this logic circuit via diode $A_{10}$. Then the negative impulse derived from the impulse controlling trigger terminal NM–12 via resistor R–1001, under the conditions mentioned above, controls the repetition cycle trigger ON via diode $A_{11}$ to "space" at its terminal ON–14, and also controls via diode $A_{12}$ the repetition cycle trigger OO into its "mark" position at its input terminal OO–13. When this occurs, another repetition cycle starts. Thus one repetition cycle continues following the other until the trigger STA is brought to its "mark" position when an unmutilated signal "I" is detected on the third or the fourth revolution of the running repetition cycle.

When a repetition cycle occurs in channel B, the repetition cycle triggers BRC or OU, OV, OW and OZ are active, the triggers OU and OV having the same function in the channel B as the triggers ON and OO do in channel A. Trigger OU goes into its "space" position at the detection of a mutilation and into its "mark" position at the reception of its special service signal "I." Trigger OV is in "space" in the third and fourth revolution, and trigger OW is in "space" during the first and fourth revolution of the repetition cycle (see chart of FIG. 6). Thus when a repetition cycle starts in channel B, the trigger STB (similar to trigger STA) is thrown into its "space" position when repetition cycle trigger OV is in its "mark" position. This trigger STB is controlled back into its "mark" position when the unmutilated signal "I" is detected on the third or on the fourth revolution of the repetition cycle to stop the repetition cycle. However, when trigger STB remains in its "space" position, it controls trigger OU to its "space" position, and trigger OV to its "mark" position, which makes the repetition cycle start again.

(3) *Transmitter*.—Referring now to FIG. 5, that part of the transmitter circuit is shown, which deals with this invention and with the circuit in FIG. 4. This transmitter circuit may comprise a tape reader TR for a five element telegraph code signal, which reader feeds a code converter CC5/7 to convert the read signals into a constant ratio code for error detection. These converted signals are then successively stepped through a plural signal (herein three signals) storage device SD before being fed to the output trigger BJ. This trigger BJ feeds successively the elements of each signal from its output terminal BJ–12 via conductor 31, the diode gating circuit G of diodes $B_1$, $B_2$, $B_3$, $B_4$, $B_5$ and $B_6$, together with resistors R–2001 and R–2002, then via conductor 32, the BJ follower trigger BJJ, and thence via conductor 33, the tone keyer K and radio transmitter ZT. A pulse generator circuit TPG sequentially controls, via conductors 35, 36, and 37, the tape reader TR, code converter CC5/7, and the discriminator TD, respectively, as well as the two channel transmitter repetition device circuits TQR–A and TQR–B and their common repetition requesting trigger circuit RQ, as will be described later.

The gate circuit G operates from input voltage derived from the trigger terminal BJ–12, and becomes conductive when the diode $B_5$ is connected to a positive voltage and the diode $B_6$ is connected to a negative voltage. This occurs when the repetition requesting trigger RQ is in its "space" position. So under these conditions the trigger BJ output voltage controls the follower trigger BJJ at its terminal BJJ–13, and the output voltage of the follower trigger terminal BJJ–12 is identical to that of the trigger terminal BJ–12. Thus signals are sent out when feeding the trigger terminal BJJ–12 voltage to the tone keyer K, while keeping the trigger RQ in its "space" position. Under these conditions while the trigger RQ in its "space" position, its terminals RQ–12 feeds a positive potential to the diodes $B_9$, $B_{12}$, $B_{15}$, $B_{18}$, and $B_{21}$ so that the logic circuits $L_1$ through $L_5$ connected to the follower trigger BJJ input terminals BJJ–13 and BJJ–14 are ineffective.

This repetition requesting trigger RQ is controlled to be in its "space" position at its input terminal RQ–13 via the logic diode $B_{22}$, which control also occurs in the seventh distributor time, determined by the positive potential on diode $B_{24}$ connected to conductor 41 with the terminal AG–10 of the seventh distributor trigger AG, and from the positive impulse to diode $B_{23}$ connected via conductor 42 to terminal AK–10 of the seventh time interval impulse controlling trigger AK of pulse generator TPG.

When a repetition is to be made and a repetition cycle started at the transmitter, the repetition requesting trigger RQ is controlled into its "mark" position at its terminal RQ–14 which takes place via the logic of diode $B_{25}$ for channel A and via the logic of diode $B_{29}$ for channel B. This operation of trigger circuit RQ also stops the tape reader TR via conductor 30.

When channel A starts a repetition cycle, due to the reception of a multilated signal, the repetition cycle trigger ON in the local or associated station receiver turns from "mark" to "space" position (see FIG. 4 in section (3) above). Its terminal ON–10 voltage then turns negative which voltage, via conductor 51, and diodes $B_{37}$ and $B_{43}$, forces the triggers ON A and ON B in the channel A transmitter repetition device circuits TRQ–A (see FIG. 5) into their "space" positions. When trigger ON B is in its "space" position, the positive voltage in its terminal ON $A_{12}$ unlocks the logic diode $B_{25}$, as the diode $B_{26}$ is positively connected. The impulse from the impulse controlling trigger AL of the pulse generator circuit TPG occurs every seventh distributor period to then make the circuit diode $B_{25}$ conductive, when diode $B_{28}$ is also connected with a positive potential. This potential for diode $B_{28}$ is derived from the terminal AH–10 of impulse controlling trigger AH which is positive when the trigger AL impulse appears in the A channel seven signal element. So repetition requesting trigger RQ then turns to its "mark" position, and the gate circuit G diodes $B_1$ through $B_6$ are made ineffective.

At the same time trigger RQ turns to its "mark" position, the negative potential at its terminal RQ–12 to the diode $B_9$, $B_{12}$, $B_{15}$, $B_{18}$, and $B_{21}$, unlocks the logic circuits $L_1$ through $L_5$ so that the distributor TD can successively generate the elements of the special service signal "I" in the signal "I" generator circuit IG. Thus at the distributor time for the first signal element, the distributor trigger AA is in "mark," and trigger BJJ is brought into its "space" position via the logic diode $B_{13}$, since trigger AA feeds the negative voltage to the diode $B_{14}$. So does the logic diode $B_{16}$ when the trigger AD is in "mark," and logic diode $B_{19}$ when the trigger AF is in "mark" for distributor signal elements times four and six, respectively (see chart of FIG. 8). Similarly the trigger BJJ is brought into its "mark" position via logic diode $B_{10}$ when distributor AB is in "mark" and via logic diode $B_{19}$ when distributor trigger AE is in "mark."

The way in which this special service signal "I" is keyed is shown in FIG. 8. During the first step of the distributor TD revolution, terminal AA–12 becomes negative so the input terminal BJJ–14 becomes negative and it output terminal BJJ–12 becomes negative, and a "space" is transmitted. During the second step terminal AB–12 becomes negative, so the input terminal BJJ–13 becomes negative and its output terminal BJJ–12 becomes positive, and a "mark" is transmitted. During the third step terminal AC–12 becomes negative, but since this terminal is not connected to one of the logics $L_1$ through $L_5$, trigger BJJ will remain in its previous position so that a "mark" again is transmitted. During the fourth step terminals AD–12 become negative so that the input terminal BJJ–14 becomes negative and its output terminal BJJ–12 becomes negative, and a "space" is transmitted. During the fifth step terminal AE–12 becomes negative so that the input terminal BJJ–13 becomes negative and its output terminal BJJ–12 becomes positive and a "mark" is transmitted. During the sixth step terminal AF–12 becomes negative so that the input terminal BJJ–14 becomes negative and its output terminal BJJ-12 becomes negative and a "space" is transmitted. During the seventh step terminal AG–12 becomes negative but since the terminal is not connected to one of the logics $L_1$ through $L_5$, trigger BJJ will remain in its previous position so that a "space" again is transmitted.

Accordingly during the distributor period 1 through 7, inclusive, the position of trigger BJJ follows:

S–M–M–S–M–S–S (see FIG. 8) wherein "S" stands for "space" and "M" stands for "mark." This is the combination of the special service signal "I" so that as long as trigger RQ is in its "mark" position, the signal transmitted is always the element combination for the special service signal "I."

If a faulty signal is detected in channel B, then the repetition requesting trigger RQ is directed to the "mark" position via diode $B_{29}$ to its input terminal RQ–14 and the channel B transmitter repetition device circuit TRQ–B shown in FIG. 5, so that output terminal RQ–12 becomes negative during the next and following revolutions of the distributor TD, and a special service signal "I" is transmitted in channel B via logic circuits $L_1$ through $L_5$ and trigger BJJ to the keyer K keying the transmitter ZT.

Accordingly when a repetition cycle is started in a receiving station due to the detection of a mutilated signal, the generation and transmission of special service signals "I" continues each revolution of the repetition cycle as long as the receiving station has not received back a special service signal "I."

However, when such or the first unmutilated special service signal "I" is received at a station, the special service signal "I" detector ID in the receiver at that station controls the repetition device TQR–A or TQR–B in that station's associated transmitter to operate the repetition requesting circuit RQ to stop the tape reader TR via conductor 30, close the gate G and transmit one special service signal "I" from the special service signal generator circuit IG, after which said gate G is opened, and the last message signals are retransmitted from the storage device SD via conductor 60 without being removed from storage. The number of signals that are retransmitted and stored when this first special service signal "I" starts a repetition cycle, corresponds to the number of signals in the repetition cycle less one, i.e., the first special service signal "I" which already has been transmitted. Herein three message signals are retransmitted from the storing device SD. However, if this first special service signal "I" is received at a station during a repetition cycle, it still causes that station to first send a special service signal "I" before retransmitting message signals from storage. The number of message signals then transmitted from storage, however, depends upon the number of revolutions remaining in that repetition cycle, if any.

The received unmutilated special signal "I" causes the repetition cycle trigger ON (see FIG. 4) to be brought into its "mark" position, which makes the potential from its terminal ON–12 via conductor 52 at the diode $B_{36}$ for channel A in the transmitter to turn negative. The simultaneous positive potential from its terminal ON–10 is applied to diode $B_{37}$ and $B_{43}$ to control the terminals ON $A_{14}$ and ON $B_{14}$ does not effect trigger RQ because the negative output of terminal ON $B_{12}$ does not now pass the logic circuit of diode $B_{25}$. However, the negative potential now on diode $B_{36}$ causes the logic diodes $B_{32}$ through $B_{36}$ to become active during the seventh period of the distributor TD when the seventh distributor trigger terminal AG–12 is negative, and when this period is a channel A seventh period, so that the terminal AH–12 is negative too. In this case, the impulse derived from the impulse controlling trigger AK can control the trigger ON A to "mark," by means of a negative impulse at its terminal ON $A_{13}$ via diode $B_{32}$. The same conditions are present at the inputs of the logic circuit which controls the trigger ON B input terminal ON $B_{13}$, however, diode $B_{39}$ is still connected with a positive potential derived from the time delay circuit of resistor R–2012 and condenser C–2001 at the trigger ON A output terminal ON $A_{12}$. When the impulse controlling trigger AK impulse occurs, which impulse makes trigger ON A go to "mark," the potential at the diode $B_{39}$ is still positive and when this potential has become negative, the trigger AK impulse has already disappeared. So trigger ON B is not controlled at all and remains in its "space" position. This causes the trigger RQ to remain in its "mark" position to generate and transmit one more special service signal "I" before deblocking the gate G. During the next revolution, however, the potential at the diode $B_{39}$ is negative and the circuit controlling trigger ON B terminal ON $B_{13}$ can become negative, thus forcing trigger ON B to "space," and at the seventh time element thereafter to change over repetition cycle trigger RQ to its "space" position opening the gate circuit G, and via conductor 60 starting the retransmission of message signals from storage device SD until the end of the repetition cycle, if not at the end already, and then via conductor 30 starting the transmission of new message signals from the tape reader TR.

What is claimed is:

1. In a telecommunication system of signals between at least two stations (P and Q) over separate channels having at each station:

(A) a transmitter (Z),
(B) a receiver (O),
(C) means (ED) for detecting mutilated signals,
(D) means (ID, IG) for generating and detecting special service signals ("I"), and
(E) a memory circuit (SD) in each transmitter for storing a predetermined number of the last transmitted signals after they have been transmitted, the improvement comprising:

(I) means (ED, ARQ or BRQ) at each station to start a repetition cycle after the detection of a mutilation and simultaneously and successively to cause the transmission of like special service signals ("I"),
(II) means (ID, ARQ or BRQ) at each station to start a repetition cycle after detection of the first one of said special service signals ("I"), (III) means (RQ) at each station responsive to the first received unmutilated special service signal ("I") even during a repetition cycle to cause the transmission of such a special service signal ("I") followed by the signals stored from said memory circuit, and (IV) means (OO or OP) at each station to detect an unmutilated special service signal ("I") during a predetermined revolution or signal interval of a repetition cycle to terminate the period of repetition at the end of that cycle.

2. A system according to claim 1 wherein said first received special service signal by the station detecting said mutilation is during said predetermined revolution or signal interval of said repetition cycle.

3. A system according to claim 1 wherein said predetermined number of signals and said predetermined revolution or signal interval of said repetition cycle correspond to the propagation time for the signals communicated between said stations.

4. An automatic error correction duplex telecommunication system for multielement code signals between two stations (P, Q) having at each station:

(I) a transmitter (Z) comprising:

(A) a source (TR) of traffic signals, (B) means (SD) to store the last predetermined number of signals transmitted, (C) a transmitter (ZT) for said signals, (D) a gate (G) between said source and said transmitter, and (E) means (IG) for generating a request for repetition signal ("I") connected to said gate; and (II) a receiver (O) comprising:

(A) a receiver (OR) for said traffic and request signals, (B) means (ED) connected to said receiver for detecting errors in each signal, (C) means (ID) for detecting said request signals ("I"), and the improvement comprising:

(I) means (ED, ARQ or BRQ) at each station to start a repetition cycle after the detection of a mutilation and simultaneously and successively to cause the transmission of like special service signals ("I"), (II) means (ID, ARQ or BRQ) at each station to start a repetition cycle after detection of the first one of said special service signals ("I"), (III) means (RQ) at each station responsive to the first received unmutilated special service signal ("I") even during a repetition cycle to cause the retransmission of such a special service signal ("I") followed by the signals stored in said storage means, and (IV) means (OO or OP at each station to detect an unmutilated special service signal ("I") during a predetermined revolution or signal interval of a repetition cycle to terminate the period of repetition at the end of that cycle.

5. A system according to claim 4 wherein said predetermined one of said number of signals is determined by the propagation time for said signals communicated between said two stations.

6. A diplex system according to claim 4 including two channels of multielement code signals.

7. A diplex system according to claim 6 wherein the signals of one channel are interspersed between the signals of the other channel.

8. A system according to claim 4 wherein said transmitter includes a distributor (TD) for controlling said means for generating said request signal.

9. A system according to claim 8 wherein said transmitter includes a pulse generator (TPG) for controlling said source of traffic signals and said distributor.

10. A system according to claim 4 wherein said transmitter includes means (TRQ) controlled by said pulse generator means for controlling said request signal generator.

11. A system according to claim 4 wherein said receiver includes an output (PR) for said correctly received signals.

12. A system according to claim 11 wherein said means for starting said repetition cycle includes means for blocking said output.

13. A system according to claim 4 wherein said transmitter and said receiver at each station includes a code converter (CC).

References Cited

UNITED STATES PATENTS

| | | |
|---|---|---|
| 2,988,596 | 6/1961 | Van Dalen. |
| 3,005,871 | 10/1961 | Rudolph. |
| 3,156,767 | 11/1964 | Van Duuren et al. |

THOMAS A. ROBINSON, Primary Examiner

U.S. Cl. X.R.

178—69; 340—146.1

PO-1050
(5/69)

UNITED STATES PATENT OFFICE
CERTIFICATE OF CORRECTION

Patent No. 3,467,776 Dated Sept. 16, 1969

Inventor(s) H. C. A. Van Duuren et al

It is certified that error appears in the above-identified patent and that said Letters Patent are hereby corrected as shown below:

Column 1, line 47, after "a" insert -- constant ratio or --;
line 72, after "the" insert -- termination of the --.
Column 7, line 71, after "for" insert -- easy -- .

SIGNED AND
SEALED
DEC 23 1969

(SEAL)
Attest:

Edward M. Fletcher, Jr.
Attesting Officer

WILLIAM E. SCHUYLER, JR.
Commissioner of Patents